US012732742B2

(12) United States Patent
Monti et al.

(10) Patent No.: US 12,732,742 B2
(45) Date of Patent: Sep. 8, 2026

(54) MICRO-ELECTRO-MECHANICAL SYSTEMS MICROPHONE WITH INCREASED BACK VOLUME

(71) Applicant: Knowles Electronics, LLC, Itasca, IL (US)

(72) Inventors: Chris Monti, Itasca, IL (US); John Szczech, Itasca, IL (US)

(73) Assignee: Knowles Electronics, LLC, Itasca, IL (US)

( * ) Notice: Subject to any disclaimer, the term of this patent is extended or adjusted under 35 U.S.C. 154(b) by 135 days.

(21) Appl. No.: 18/944,206

(22) Filed: Nov. 12, 2024

(65) Prior Publication Data

US 2026/0136130 A1 May 14, 2026

(51) Int. Cl.
*H04R 1/22* (2006.01)
*H04R 1/04* (2006.01)
*H04R 19/04* (2006.01)

(52) U.S. Cl.
CPC ............... *H04R 1/222* (2013.01); *H04R 1/04* (2013.01); *H04R 19/04* (2013.01); *H04R 2201/003* (2013.01); *H04R 2410/03* (2013.01)

(58) Field of Classification Search
CPC .......... H04R 1/222; H04R 1/04; H04R 19/04; H04R 2201/003; H04R 2410/03; H04R 1/22
See application file for complete search history.

(56) References Cited

U.S. PATENT DOCUMENTS 8,999,757 B2 * 4/2015 Protheroe ........... B81C 1/00309 257/E23.128
9,002,038 B2 4/2015 Ochs et al.
9,082,883 B2 * 7/2015 Protheroe ........... B81C 1/00309
9,337,354 B2 5/2016 Protheroe et al.
9,641,940 B2 5/2017 Salmon et al.
9,661,421 B2 5/2017 Salmon et al.
10,028,068 B2 7/2018 Salmon et al.
2013/0193533 A1 * 8/2013 Vos ....................... B81B 3/0064 257/416
2014/0246738 A1 * 9/2014 Protheroe ........... B81C 1/00309 438/51
2014/0367810 A1 * 12/2014 Vos ....................... B81B 7/0061 257/416

FOREIGN PATENT DOCUMENTS

CN 102595293 A 7/2012

* cited by examiner

*Primary Examiner* — Yosef K Laekemariam
(74) *Attorney, Agent, or Firm* — FLENER IP & BUSINES; Zareefa B. Flener; Yongae Jun

(57) ABSTRACT

A Micro-Electro-Mechanical System (MEMS) microphone can include a housing, an integrated circuit (IC), and a MEMS transducer. The housing can include a cover mounted on a base having a first printed circuit board (PCB) facing a second PCB. A first recess can be located in the base and be at least partially defined by an aperture through the first PCB. A second recess can be located in the base and be at least partially defined by a cavity in the first PCB. An internal electrical interface can be located in the housing on a side of the first PCB facing the second PCB. The MEMS transducer can be electrically connected to the IC and include a diaphragm that separates an interior of the housing into a front volume and a back volume, wherein the first recess and the second recess constitute a portion of the back volume.

19 Claims, 8 Drawing Sheets

MICRO-ELECTRO-MECHANICAL SYSTEMS MICROPHONE WITH INCREASED BACK VOLUME

FIELD OF THE DISCLOSURE

The present disclosure relates generally to Micro-Electro-Mechanical Systems (MEMS) microphones, and more particularly to top port MEMS microphones.

BACKGROUND

Micro-Electro-Mechanical Systems (MEMS) transducers are increasingly used in all manner of applications for their small size, low cost, and the ability to readily integrate them in host devices and systems. MEMS transducers are commonly used for detecting sound in wireless handsets, laptop computers, smart speakers, wireless earphones, headsets, appliances and automobiles, among a variety of other consumer and industrial goods and machinery.

Improving the acoustic performance of MEMS microphones is desired. Improvements can arise from increasing the sensitivity of the MEMS microphone, increasing the Signal-to-Nosie Ratio (SNR), and improving the low frequency response of the microphone. Each of these performance characteristics may be improved by increasing the back volume of the MEMS microphone.

Unfortunately, the space available for increasing the back volume in MEMS microphones is very limited, especially due to the demand for increasingly smaller and smaller devices. This is especially true for top port MEMS microphones. Therefore, there is a need for a MEMS microphone having improved acoustic performance, and in particular for a top port MEMS microphone having an increased back volume.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore considered to solely limit its scope. The drawings may have been simplified for clarity and are not necessarily drawn to scale. Those of ordinary skill in the art will appreciate that the terms and expressions used herein have the meaning understood by those of ordinary skill in the art except where different meanings are attributed to them herein. Like reference numerals refer to like elements or components throughout. Like elements or components will therefore not necessarily be described in detail with respect to each figure.

DETAILED DESCRIPTION

Figure 1:
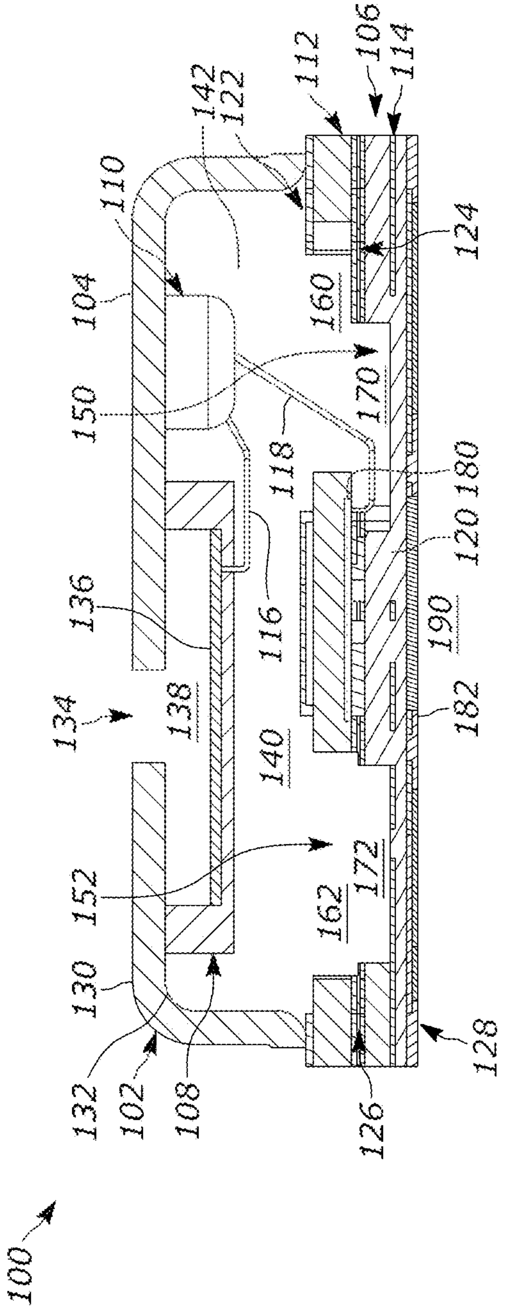
FIG. 1 is a cross-sectional view of a representative MEMS microphone with increased back volume.

The present disclosure relates generally to a top port MEMS microphone having improved acoustic performance attributable to a larger back volume. A MEMS microphone generally comprises a MEMS transducer and an integrated circuit (IC) disposed in a housing including a cover mounted on a multilayer base. The MEMS transducer is mounted over a sound port on an inner side of the cover. The MEMS transducer is electrically connected to the IC, and the IC is electrically connected to an external electrical interface on an exterior of the housing. The MEMS transducer, and more specifically, a diaphragm in the MEMS transducer separates the interior of the housing into a front volume and a back volume. The front volume is located between the MEMS transducer and the cover, and more specifically between the sound inlet port (in the cover) and the diaphragm. The back volume is located on the other side of the diaphragm, and more specifically between the diaphragm and the base.

According to the present disclosure, one or more recesses formed in the base increase the overall volume of the back volume of the MEMS microphone, thereby improving acoustic performance by increasing sensitivity, or increasing SNR, and/or improving the low frequency response of the MEMS microphone. The one or more recesses can be defined by a cavity or aperture or both in layers of the multilayer base as described further herein.

In one implementation, a first PCB is fastened to a second PCB, and an internal electrical interface on the first or second PCB is located between the first and second PCBs. The internal electrical interface is electrically connected to the external electrical interface. The IC, which can be an Application Specific Integrated Circuit (ASIC), is mounted on an inner side of the cover or elsewhere within the housing. The IC is electrically connected to the internal electrical interface by one or more electrical conductors that extend into a first recess of the base. The first recess comprises an aperture through the first PCB and an adjoining passage extending from the aperture to the internal electrical interface. The passage can be a portion of a cavity in the second PCB that overlaps the internal electrical interface of the first PCB. Alternatively, the passage can be a channel in the first PCB, or a channel in the second PCB, a channel in both the first and second PCBs, or a channel in combination with the cavity in the second PCB. The first recess alone increases the back volume. As used herein, an "aperture" refers to an opening that extends fully through a PCB, and a "cavity" means an opening that extends only partially through a PCB. Depending on the implementation, a "recess" can be defined by a cavity or an aperture in the first PCB, or by an aperture in the first PCB and a cavity in the second PCB.

In other implementations, a second recess is disposed in the base to further increase the back volume. The second recess comprises at least a cavity in the first PCB. Alternatively, the second recess comprises an aperture through the first PCB alone or in combination with an adjoining cavity in the second PCB. Such arrangements can be particularly useful for improving acoustic performance in top port MEMS microphones. Details of representative implementations are described more fully herein with reference to FIGS. 1-12.

Figure 2:
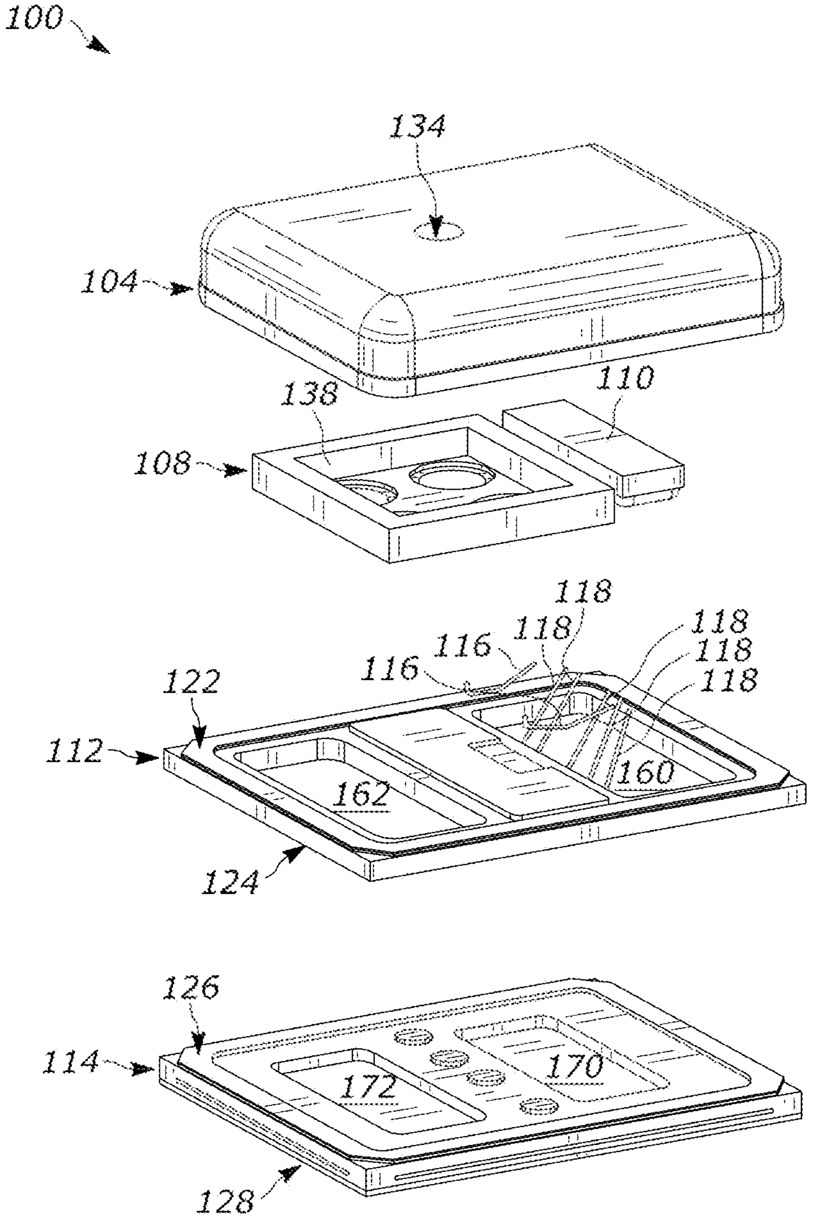
FIG. 2 is an exploded perspective view of a representative MEMS microphone with increased back volume.

FIGS. 1 and 2 depict a MEMS microphone 100 that is configured and constructed to provide increased back volume in accordance with a representative embodiment. The MEMS microphone 100 includes a housing 102 including a cover 104 and a base 106. The MEMS microphone 100 further includes a MEMS transducer 108 electrically connected to an IC 110 by one or more conductors 116. The base 106 includes a first PCB 112 and a second PCB 114, the first PCB 112 facing the second PCB 114. One or more other electrical conductors 118 electrically connect the IC 110 to the internal electrical interface 180 on the first PCB 112. The internal electrical interface 180 on the first PCB 112 and the external electrical interface 182 on the second PCB 114 are electrically connected, such as by conductive vias extending through one or both PCBs.

In FIG. 1, the first PCB 112 includes a first side 122 and a second side 124 opposite the first side 122. The second PCB 114 also includes first and second opposite sides, which may be considered a facing side 126 (facing towards the first PCB 112) and an opposite side 128 (facing in an opposite direction away from the first PCB 114). The cover 104 includes an outer side 130 and an inner side 132 opposite the outer side 130. The cover 104 is located on the first side 122 of the first PCB 112, which faces away from the second PCB 112.

The cover 104 can include materials such as metal, metallized plastic or other material. The cover 104 can also be referred to as a lid or a cup. The cover 104 is affixed to the first side 122 of the first PCB 112 to enclose, electrically and acoustically seal and protect the internal components, such as the MEMS transducer 108, the IC 110, internal portions of the first and second PCBs 112, 114, and the electrical conductors 116, 118. The cover 104 can have a substantially rectangular, circular, elliptical, or any polygonal shape. A top of the cover 104 includes a sound port 134.

In FIG. 1, the MEMS transducer 108 located in the housing 102 and is mounted on the inner side 132 of the cover 104 over the sound port 134. The MEMS transducer 108 includes a diaphragm 136 spaced apart from a perforated back plate. The diaphragm 136 is free to move in relation to the back plate in response to acoustic signals entering the housing through the sound port 134. The movement of the diaphragm 136 in relation to the back plate causes a capacitance associated with the MEMS transducer 108 to vary. The change in the capacitance of the MEMS transducer 108 is converted into a corresponding electrical signal. Other MEMS transducer may include one or more diaphragms that can move in relation to one or more back plates. In FIG. 1, the diaphragm 136 separates an interior of the housing 102 into a front volume 138 and a back volume 140. The front volume 138 is located between the diaphragm 136 and the sound port 134. The back volume 140 is located between the diaphragm 136 and the base 106.

In FIG. 1, first recess 150 located in the base 106 is defined by a first aperture 160 through the first PCB 112 and a cavity 170 in the second PCB 114. Alternatively, the first recess can comprise an aperture through the first PCB and a passage extending from the aperture toward the internal electrical interface. A second recess 152 located in the base 106 comprises a second aperture 162 through the first PCB 112 and a cavity 172 in the second PCB 114. Alternatively, the second recess can comprise only a cavity in the first PCB or only an aperture through the first PCB. In FIG. 1, the first aperture 160 of the first recess 150 and the second aperture 162 of the second recess 152 constitute discrete, separate apertures through the first PCB 112. In alternative embodiments, the first aperture of the first recess and the second aperture of the second recess constitute a contiguous aperture (see FIGS. 10 and 11 as examples) through the first PCB.

In an alternative embodiment, the second recess located in the base is defined by only a cavity in the first PCB (see cavity 670 in FIG. 6 as an example), or by only an aperture through the first PCB. While the one or more recesses can extend fully through the first PCB, any portion of the recess that extends into the second PCB cannot extend fully through the second PCB.

In FIG. 1, the first aperture 160 and the first cavity 170 of the first recess 150 partially overlap one another to provide a passage to the internal electrical interface 180. Alternatively, the first aperture and the first cavity may fully overlap one another provided there is a passage from the first recess to the internal electrical interface. The second aperture 162 and the second cavity 172 of the second recess fully overlap one another to maximize the size of the first recess 150. Alternatively, the second aperture and the second cavity at least partially overlap one another, for example to accommodate structure embedded in the one of the PCBs. The PCBs 112, 114 may each include a plurality of layers, where the recesses 150, 152 may be formed by removing at least a portion of the plurality of layers by milling or other known or future removal operation. Thus configured, the first recess 150 and the second recess 152 constitute a portion of the back volume 140, thereby increasing the overall size of the back volume.

Referring still primarily to FIGS. 1-2, the MEMS microphone 100 further includes an internal electrical interface 180 and an external electrical interface 182. The internal electrical interface 180 is located in the housing 102 and on the second side 124 of the first PCB 112 facing the second PCB 114. At least a portion of the second cavity 170 or some other passage adjoining the first aperture 160 overlaps the internal interface. The external electrical interface 182 is located on the opposite side 128 of the second PCB 114 facing an exterior 190 of the housing 102. The external electrical interface 182 is electrically connected to the internal electrical interface 180.

In FIG. 1, IC 110 is mounted on the inner side 132 of the cover 104 and can include analog and/or digital circuitry for processing signals received from the MEMS transducer 108. Alternatively, the IC can be located elsewhere in the housing. In accordance with a representative embodiment, the IC is an Application Specific Integrated Circuit (ASIC). The IC may be an integrated circuit package and may have a plurality of pins or bonding pads that facilitate electrical connectivity to components outside of the IC via electrical conductors, such as wires. In FIG. 2, the IC 110 includes bonding pads to which electrical conductors 118 electrically connect the IC 110 to the internal electrical interface. Bonding pads can also be present on the IC 110 for connecting one or more wires (electrical conductors 116) between the MEMS transducer 108 and the IC 110. The analog and/or digital circuitry on the IC 110 may include amplifiers, filters, analog-to-digital converters, digital signal processor, and other electrical circuitry for processing the signals received from the MEMS transducer 108 and sending electrical signals to external electrical interface. In a representative embodiment, one or more bonding pads on the IC 110, the first PCB 112, and the second PCB 114 can be gold bonding pads, which can improve corrosion resistance due to exposure to moisture and other environmental substances.

Figure 3:
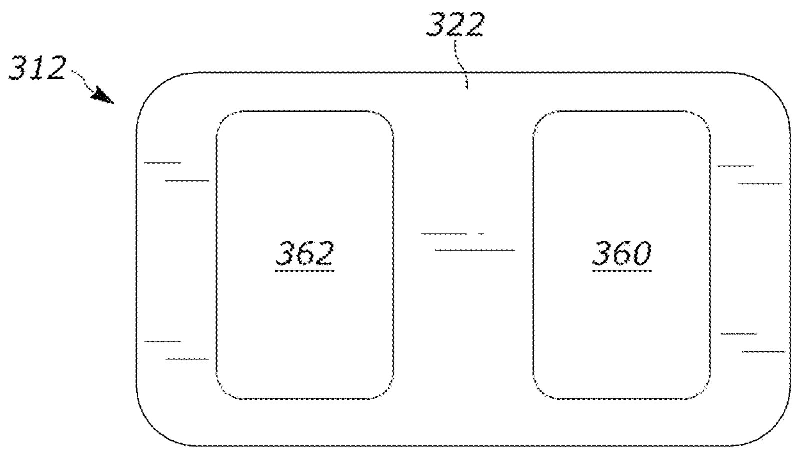
FIG. 3 is a top plan view of a representative first printed circuit board (PCB) of a MEMS microphone with increased back volume.
Figure 10:
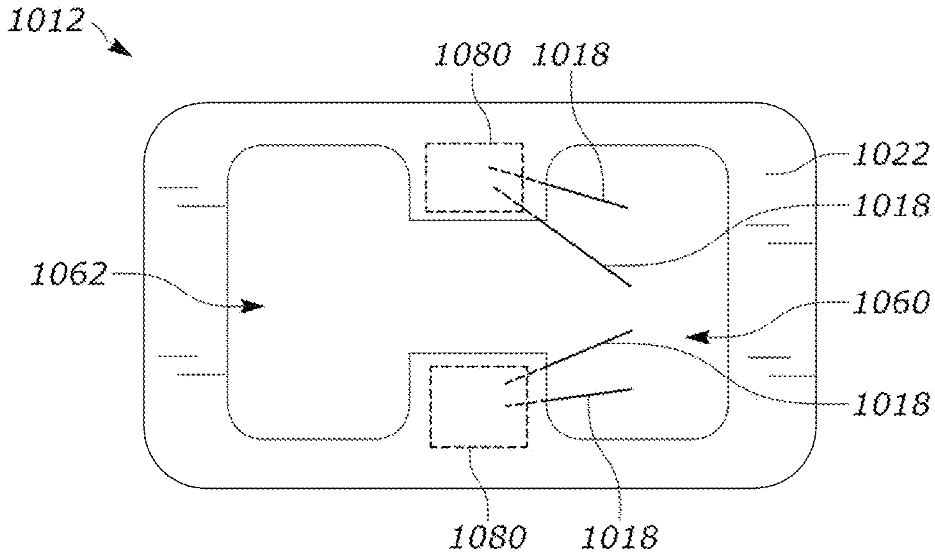
FIG. 10 is a top plan view illustrating a representative arrangement of electrical conductors of a first PCB of a MEMS microphone with increased back volume.
Figure 11:
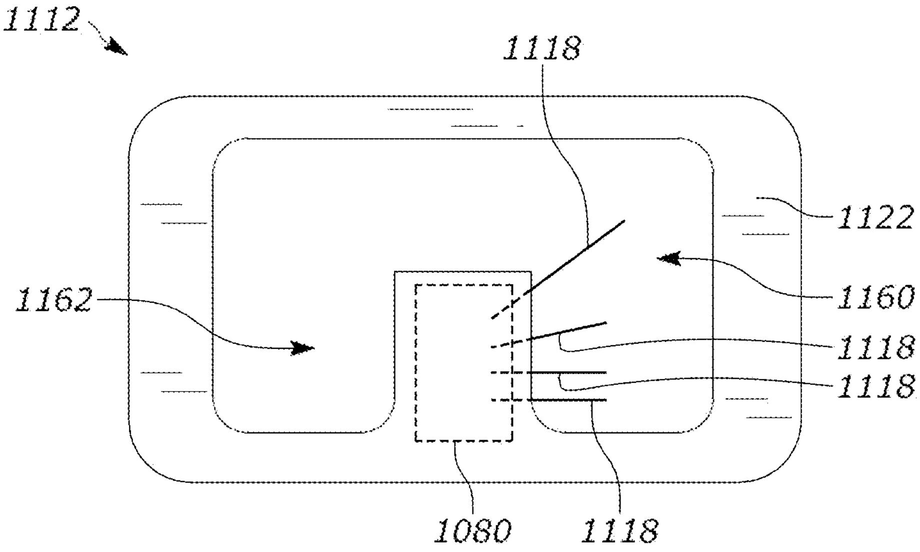
FIG. 11 is a top plan view illustrating yet another representative arrangement of electrical conductors within yet another first PCB of a MEMS microphone with increased back volume.

In FIGS. 1 and 2, the IC 110 is electrically connected to the internal electrical interface 180 located between the first and second PCBs 112 and 114. The IC 110 is electrically connected to the internal electrical interface 180 by one or more electrical conductors 118 extending through the first aperture 160 and further into the cavity 170 of the first recess 150 shown best in FIG. 1. In FIG. 3, a bridge portion on which the internal electrical interface can be mounted separates the first and second recesses 150 and 152. Alternatively, the internal electrical interface is mounted on a lobe-shaped portion that partially extends into a common aperture of the first and second recesses, as shown in FIGS. 10-11. The lobe-shaped portion of the first PCB 1012 or 1112 protrudes into a contiguous aperture that includes both of the first and second apertures 1060, 1062 or 1160, 1162. Other shaped portions may be used.

Figure 12:
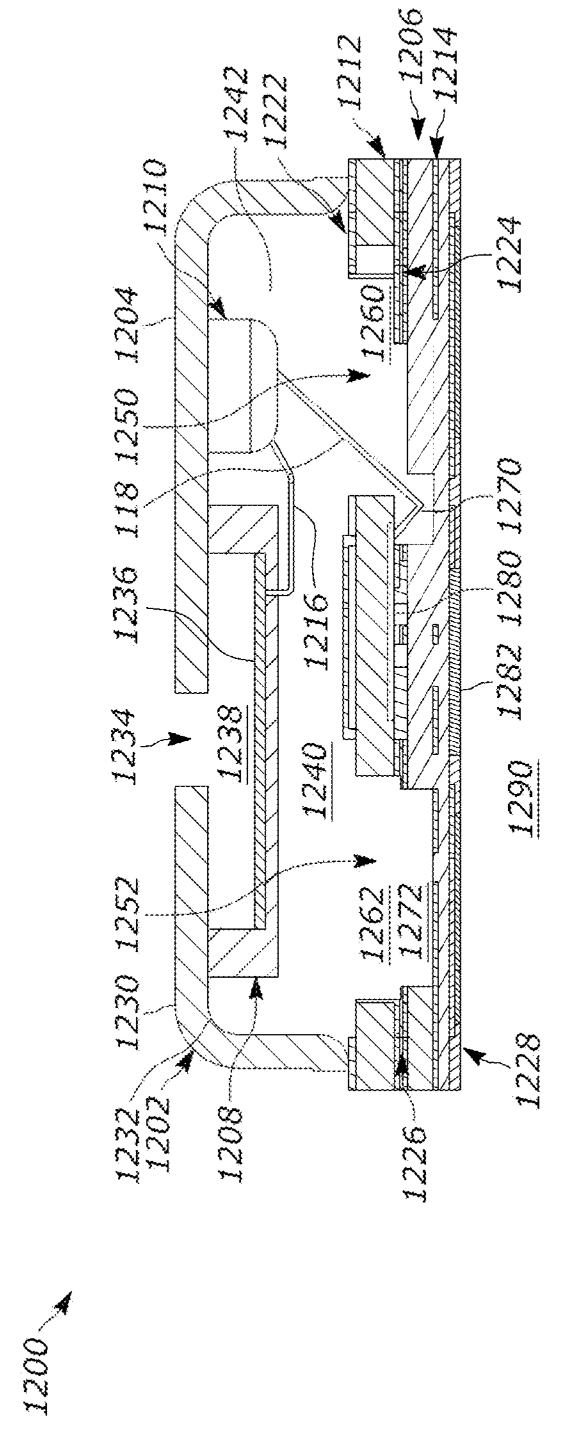
FIG. 12 is a cross-sectional view of another possible MEMS microphone with increased back volume and alternative electrical conductor arrangement.

In some embodiments, the IC may be electrically connected to the internal electrical interface by the electrical conductor extending through the first aperture 160 of the first recess into a passage between the first aperture and the internal electrical interface. The passage may be located between the first recess and the internal electrical interface. The passage may be, for example, a bore or a channel in the first PCB, or the second, or both the first and second PCBs. As can be seen in FIG. 12, a representative passage for the electrical conductor 1218 extends from a sidewall defining the first aperture 1260 to the internal electrical interface 1280, which is located on a bottom of the first PCB 1212.

Figure 4:
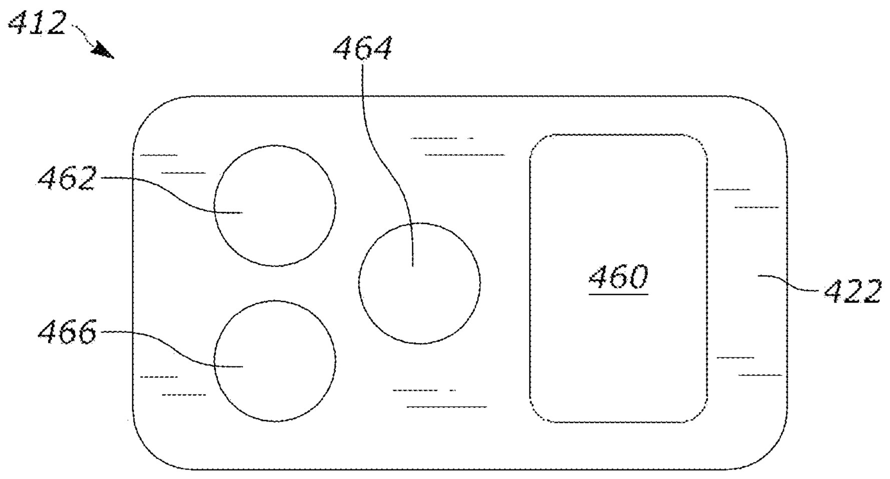
FIG. 4 is a top plan view of another representative first PCB of a MEMS microphone with increased back volume.
Figure 5:
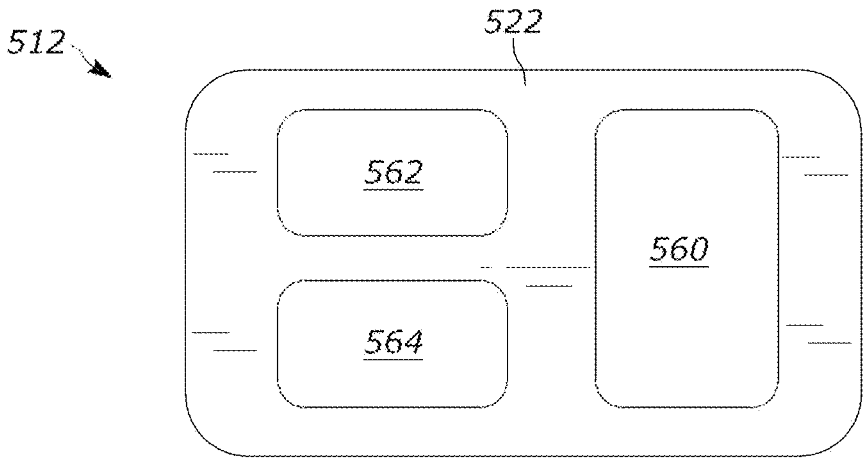
FIG. 5 is a top plan view of yet another representative first PCB of a MEMS microphone with increased back volume.
Figure 6:
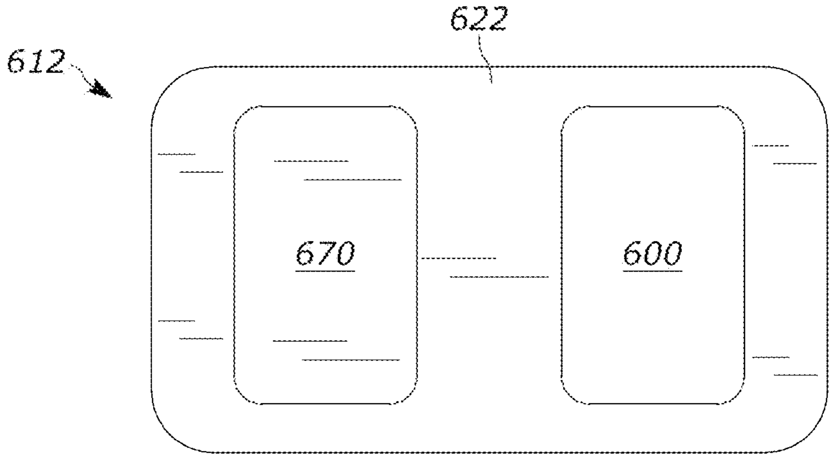
FIG. 6 is a top plan view of a further representative first PCB of a MEMS microphone with increased back volume.

Referring primarily to FIGS. 3-11, representative implementations of the first PCB, second PCB, apertures, cavities and electrical path routing of the improved back volume MEMS microphone 100 of the present disclosure are described. In the representative implementations, the apertures and cavities are depicted in particular shapes, such as rounded corner rectangle or circular. It should be understood that they could alternately be rectangles, squares, ovals, or other shapes that would provide for sound transmission therethrough for improved back volume. FIG. 3 is a top plan view of a first PCB 312 which includes a first side 322 and a second side (not shown) opposite the first side 322. The first PCB 312 also includes a first aperture 360 and a second aperture 362. FIG. 4 is a top plan view of an alternative first PCB 412 that includes a first aperture 460 and a plurality of second apertures 462, 464, 466. FIG. 5 is a top plan view of another alternative first PCB 512 including a first aperture 560, a second aperture 562, and a third aperture 564. FIG. 6 is a top plan view of yet another alternative first PCB 612 including a first aperture 660 and a cavity 670.

Figure 7:
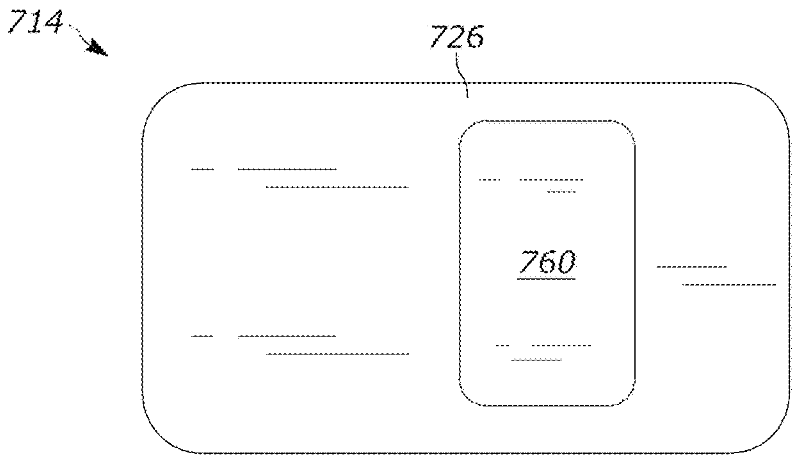
FIG. 7 is a top plan view of a representative second PCB of a MEMS microphone with increased back volume.
Figure 8:
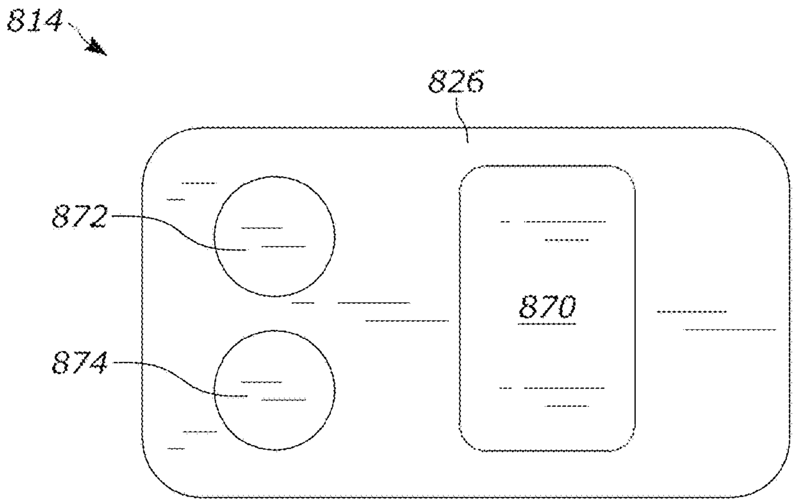
FIG. 8 is a top plan view of another representative second PCB of a MEMS microphone with increased back volume.
Figure 9:
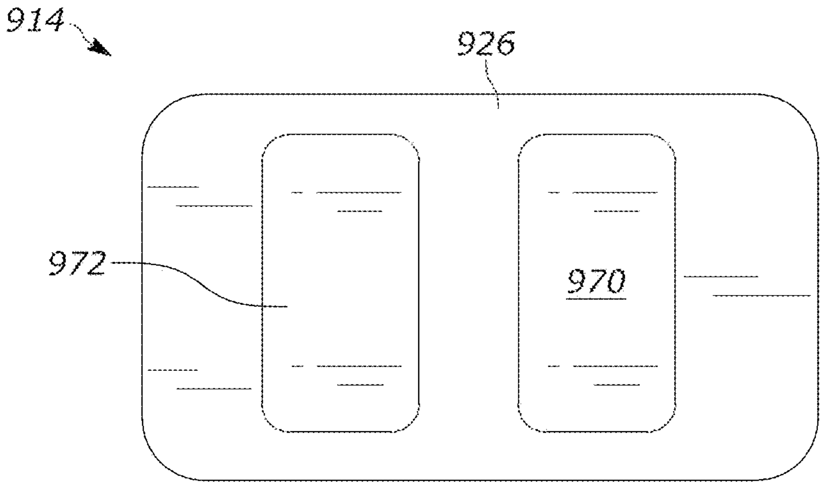
FIG. 9 is a top plan view of yet another representative second PCB of a MEMS microphone with increased back volume.

FIGS. 7-9 depict representative implementations of the second PCB. FIG. 7 is a top plan view of a second PCB 714 which includes a facing side 726 and a second side (not shown) opposite facing side 726. Second PCB 714 includes a cavity 760 defined therein. The cavity 760 of the second PCB 714 may be slightly offset from the adjoining first aperture in a first PCB to provide a passage to the internal electrical interface. The cavity 760 can also align completely with the first aperture in the first PCB provided there is some other passage, to accommodate the conductor, between the first recess and the internal electrical interface. There should be at least some overlap between apertures in the first PCB and cavities in an adjacent second PCB, thereby increasing the back volume of the MEMS microphone. For example, there should be at least some overlap between the cavity 760 of the second PCB 714 depicted in FIG. 7 and any one of the first apertures 360, 460, 560, 660 depicted in the first PCB of FIGS. 3-6. FIG. 8 is a top plan view of an alternative second PCB 814 including cavities 870, 872, 874 defined therein. The cavities 870, 872, 874 extend vertically through some but not all layers of the second PCB 814. FIG. 9 is a top plan view of another alternative second PCB 914 including a first cavity 970 and a second cavity 972 defined therein.

FIG. 10 is a top plan view of an implementation of a first PCB 1012 of a MEMS microphone with increased back volume in accordance with one implementation. The first PCB 1012 includes a first side 1022 and first and second apertures 1060 and 1062 which are contiguous with another. The electrical conductors 1018 connect the IC (not shown) to the internal electrical interface 1080 located on an underside of the first PCB 1012. The first PCB 1012 may include a pair of internal electrical interfaces 1080 each located on opposite lobe-shaped portions of the first PCB 1012. The electrical conductors 1018 electrically connect the IC (not shown) to the pair of internal electrical interfaces 1080 as described herein.

FIG. 11 is a top plan view of an alternative implementation of a first PCB 1112. The first PCB 1112 includes a first side 1122 and first and second apertures 1160 and 1162 which are contiguous with another. The electrical conductors 1118 connect the IC (not shown) to the internal electrical interface 1180 located on an underside of the first PCB 1112. The internal electrical interface 1180 may be located on a lobe-shaped portion of the first PCB 1112. The electrical conductors 1118 electrically connect the IC (not shown) to the internal electrical interface 1180 as described herein.

Any one or more of the combination, arrangement, location and dimensions of the first and second recesses may be configured and/or arranged relative to one another and/or relative to the dimensions of the cover that define a portion of the back volume, in order to increase the sensitivity of the MEMS microphone, increase the SNR, and/or improve the low frequency response of the MEMS microphone. The dimensions and locations of the recesses may be configured to, for example, provide for or not exceed a predetermined SNR threshold value, a predetermined frequency response value or a predetermined microphone sensitivity level.

While the disclosure has been described with specific embodiments thereof and in a manner establishing possession and enabling those of ordinary skill in the art to make and use the same, it will be understood and appreciated that there are many equivalents to the select embodiments described herein and that myriad modifications and variations may be made thereto without departing from the scope and spirit of the disclosure, which is to be limited not by the embodiments described herein but by the appended claims and their equivalents. For example, various components of the embodiments may be interchanged, added, or substituted in the other embodiments. Also, all of the elements of each figure may not be necessary for operation of the disclosed embodiments.

What is claimed is:

1. A Micro-Electro-Mechanical Systems (MEMS) microphone comprising:

a housing comprising a cover mounted on a base comprising a first printed circuit board (PCB) facing a second PCB, the cover located on a side of the first PCB facing away from the second PCB;

a first recess located in the base and at least partially defined by an aperture through the first PCB;

a second recess located in the base and at least partially defined by a cavity in the first PCB;

an internal electrical interface located in the housing and between the first PCB and the second PCB;

an external electrical interface located on a side of the base facing an exterior of the housing, the external electrical interface electrically connected to the internal electrical interface;

an Integrated Circuit (IC) located in the housing and electrically connected to the internal electrical interface; and a MEMS transducer located in the housing and mounted on an inner side of the cover over a sound port of the cover, the MEMS transducer electrically connected to the IC, the MEMS transducer comprising a diaphragm that separates an interior of the housing into a front volume and a back volume, the front volume located between the diaphragm and the sound port, and the back volume located between the diaphragm and the base, wherein the first recess and the second recess constitute a portion of the back volume.

2. The MEMS microphone of claim 1, wherein the IC is electrically connected to the internal electrical interface by an electrical conductor extending through the aperture of the first recess and into a passage between the first recess and the internal electrical interface.

3. The MEMS microphone of claim 1, the first recess comprising a cavity in the second PCB, the cavity overlapping the internal electrical interface, wherein the IC is electrically connected to the internal electrical interface by an electrical conductor extending through the aperture of the first recess and into the cavity of the first recess.

4. The MEMS microphone of claim 3, wherein the internal electrical interface is located on a side of the first PCB facing the second PCB.

5. The MEMS microphone of claim 1, wherein the second recess comprises an aperture through the first PCB.

6. The MEMS microphone of claim 5, wherein the second recess further comprises a cavity in the second PCB.

7. The MEMS microphone of claim 1, wherein the IC is mounted on the inner side of the cover.

8. The MEMS microphone of claim 1, wherein the internal electrical interface is located between the first recess and the second recess.

9. The MEMS microphone of claim 8, wherein the internal electrical interface is located on a portion of the first PCB separating the first recess and the second recess.

10. A Micro-Electro-Mechanical Systems (MEMS) microphone comprising:

a housing comprising a cover mounted on a base comprising a first printed circuit board (PCB) facing a second PCB, the cover located on a side of the first PCB facing away from the second PCB;

a first recess located in the base and comprising an aperture through the first PCB and a cavity in the second PCB;

a second recess located in the base and at least partially defined by a cavity in the first PCB;

an internal electrical interface located in the housing and on a side of the first PCB facing the second PCB;

an external electrical interface located on a side of the base facing an exterior of the housing, the external electrical interface electrically connected to the internal electrical interface;

an Integrated Circuit (IC) mounted on the inner side of the cover and electrically connected to the internal electrical interface via a conductor extending through the aperture of the first recess and into the cavity of the first recess; and a MEMS transducer located in the housing and mounted on an inner side of the cover over a sound port of the cover, the MEMS transducer electrically connected to the IC, the MEMS transducer comprising a diaphragm that separates an interior of the housing into a front volume and a back volume, the front volume located between the diaphragm and the sound port, and the back volume located between the diaphragm and the base, wherein the first recess and the second recess constitute a portion of the back volume.

11. The MEMS microphone of claim 10, wherein the internal electrical interface is located between the first recess and the second recess.

12. The MEMS microphone of claim 10, wherein the second recess comprises an aperture through the first PCB.

13. The MEMS microphone of claim 12, wherein the second recess further comprises a cavity in the second PCB.

14. The MEMS microphone of claim 12, wherein the aperture of the first recess and the aperture of the second recess constitute a contiguous aperture through the first PCB.

15. The MEMS microphone of claim 14, wherein the internal electrical interface is located on a portion of the first PCB protruding into the contiguous aperture through the first PCB.

16. The MEMS microphone of claim 15, wherein the second recess further comprises a cavity in the second PCB.

17. A Micro-Electro-Mechanical Systems (MEMS) microphone comprising:

a housing comprising a cover mounted on a base comprising a first printed circuit board (PCB) facing a second PCB, the cover located on a side of the first PCB facing away from the second PCB;

a first recess located in the base and comprising an aperture through the first PCB and a cavity in the second PCB;

an internal electrical interface located in the housing and on a side of the first PCB facing the second PCB;

an external electrical interface located on a side of the base facing an exterior of the housing, the external electrical interface electrically connected to the internal electrical interface;

an Integrated Circuit (IC) mounted on the inner side of the cover and electrically connected to the internal electrical interface via a conductor extending through the aperture of the first recess and into the cavity of the first recess; and a MEMS transducer located in the housing and mounted on an inner side of the cover over a sound port of the cover, the MEMS transducer electrically connected to the IC, the MEMS transducer comprising a diaphragm that separates an interior of the housing into a front volume and a back volume, the front volume located between the diaphragm and the sound port, and the back volume located between the diaphragm and the base, wherein the first recess and the second recess constitute a portion of the back volume.

18. The MEMS microphone of claim 17, wherein the internal electrical interface is located on a portion of the first PCB protruding into the aperture through the first PCB.

19. The MEMS microphone of claim 18, wherein the internal electrical interface is located between the first recess and the second recess.

* * * * *